US012769730B2

(12) United States Patent
Zhi et al.

(10) Patent No.: US 12,769,730 B2
(45) Date of Patent: Oct. 20, 2026

(54) METHOD AND SYSTEM FOR LOW-SAMPLE CHAINED NL2SQL GENERATION BASED ON CLAUSE DEPENDENCY

(71) Applicant: Netis Technologies Co., LTD, Shanghai (CN)

(72) Inventors: Fenglin Zhi, Shanghai (CN); Guanghui Yang, Shanghai (CN)

(*) Notice: Subject to any disclaimer, the term of this patent is extended or adjusted under 35 U.S.C. 154(b) by 0 days.

(21) Appl. No.: 19/006,061

(22) Filed: Dec. 30, 2024

(65) Prior Publication Data

US 2026/0105049 A1 Apr. 16, 2026

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC ......................... G06F 16/24522; G06F 16/243
See application file for complete search history.

(56) References Cited

U.S. PATENT DOCUMENTS

| | | | | |
|---|---|---|---|---|
| 2024/0061834 A1* | 2/2024 | Tangari | ............ | G06F 16/24522 |
| 2024/0362212 A1* | 10/2024 | Sun | .................. | G06F 16/24522 |
| 2025/0190604 A1* | 6/2025 | Fu | ........................ | G06F 16/242 |

* cited by examiner

*Primary Examiner* — Aleksandr Kerzhner
*Assistant Examiner* — Aryan D Toughiry

(57) ABSTRACT

A method for low-sample chained NL2SQL generation based on clause dependency includes steps of: step S1: obtaining query samples of a natural language to a SQL; performing intent clarification on the natural language to obtain intent clarification samples; and expanding a quantity of the query samples with a dynamic template; step S2: constructing an intent clarification adapter using the intent clarification samples; and constructing an SQL clause generation adapter group; and step S3: using the intent clarification adapter to performing intent clarification on an input natural language question, and using the SQL clause generation adapter group to perform SQL chain generation for a clarified language. The method is capable of highly accurate NL2SQL through automatic data generation given a very small number of samples, which solves the problem that the model generation results in the prior art are completely dependent on the number of samples.

10 Claims, 2 Drawing Sheets

METHOD AND SYSTEM FOR LOW-SAMPLE CHAINED NL2SQL GENERATION BASED ON CLAUSE DEPENDENCY

CROSS REFERENCE OF RELATED APPLICATION

The present invention claims priority under 35 U.S.C. 119(a-d) to CN 202411781029.8, filed Dec. 4, 2024.

BACKGROUND OF THE PRESENT INVENTION

Field of Invention

The present invention relates to a technical field of language recognition, and more particularly to a method and a system for low-sample chained NL2SQL generation based on clause dependency.

Description of Related Arts

NL2SQL, short for "Natural Language to SQL", is a query that facilitates database querying for people without SQL knowledge by converting natural language to SQL through artificial intelligence and other methods. Conventional NL2SQL implementation often requires a large number of labeled samples (e.g., sample pairs from "language" to "SQL") for model training, thereby achieving a high accuracy. However, the "large number of labeled samples" cost huge labor and time, which seriously delay the implementation of NL2SQL functionality.

Chinese patent CN117971861A, Feature decoupled configurable NL2SQL method, adopts regular matching and migration learning to extract the corresponding features of scenario, intent, time and business dimensions, and then generates the corresponding SQL, which emphasizes how to generate high-accuracy SQL by chain adapters with small samples.

Chinese patent CN116776893A, NL2SQL method and system based on hierarchical feature decoupling, adopts dataset of NL2SQL to compute the decoupled feature representations of the morphemes in different SQLs, and selects the appropriate morphemes to construct high-quality SQLs based on the user inputs during operating.

SUMMARY OF THE PRESENT INVENTION

In response to the shortcomings in the prior art, an object of the present invention is to provide a method and a system for low-sample chained NL2SQL generation based on clause dependency.

The method of the present invention for low-sample chained NL2SQL generation based on clause dependency comprises steps of:

- step S1: obtaining query samples of a natural language to a SQL; performing intent clarification on the natural language to obtain intent clarification samples; and expanding a quantity of the query samples with a dynamic template;
- step S2: constructing an intent clarification adapter using the intent clarification samples; and constructing an SQL clause generation adapter group; and
- step S3: using the intent clarification adapter to performing intent clarification on an input natural language question, and using the SQL clause generation adapter group to perform SQL chain generation for a clarified language.

Preferably, the step S1 comprises specific steps of:

- step S1.1: obtaining a query sample set, wherein each of the query samples is a binary containing the natural language and the SQL; the natural language indicates an operation to be performed and the SQL is a corresponding database query language;
- step S1.2: using a clarification template to prompt a large model to generate a corresponding clarified question for the SQL in the query samples; and generating the intent clarification samples in conjunction with the natural language;
- step S1.3: drawing the query samples out one by one from the query sample set, and prompting the large model to generate a similar SQL to the query samples through a prompt template comprising a list of operations randomly selected from an operation set; then using the clarification template to prompt the large model to generate a corresponding formalized question based on the generated SQL; and
- step S1.4: randomly selecting N query samples from the query sample set, using the prompt template to prompt the large model to generate similar SQLs with reference to the N query samples, and use the clarification template to prompt the large model to generate corresponding formalized questions based on the generated SQLs.

Preferably, the step S2 comprises specific steps of:

- step S2.1: training a large language model with the intent clarification template to obtain the intent clarification adapter; and
- step S2.2: training the SQL clause generation adapter group, wherein the SQL clause generation adapter group comprises: a Select adapter, a From/Where adapter, a Having/Group adapter and an Order/Limit adapter.

Preferably, the step S3 comprises specific steps of:

- step S3.1: performing intent clarification on the input natural language question based on the intent clarification adapter to obtain the clarified question; and
- step S3.2: performing SQL chain generation for the clarified question with the SQL clause generation adapter group.

Preferably, in the step S2.2:

- an input to the Select adapter is the clarified question; and an output is a Select section of an SQL statement;
- an input to the From/Where adapter is the clarified question and the Select section of the SQL statement; and an output is From and Where sections of the SQL statement;
- an input to the Having/Group adapter is the clarified question, the Select section, and the Where section; and an output is Having and Group sections of the SQL statement; and
- an input to the Order/Limit adapter is the clarified question, the Select section, and the Group section; and an output is Order and Limit sections of the SQL statement.

The system of the present invention for low-sample chained NL2SQL generation based on clause dependency comprises:

- a module M1 for obtaining query samples of a natural language to a SQL; performing intent clarification on the natural language to obtain intent clarification samples; and expanding a quantity of the query samples with a dynamic template;

a module M2 for constructing an intent clarification adapter using the intent clarification samples; and constructing an SQL clause generation adapter group; and a module M3 for using the intent clarification adapter to performing intent clarification on an input natural language question, and using the SQL clause generation adapter group to perform SQL chain generation for a clarified language.

Preferably, the module M1 comprises:

a module M1.1 for obtaining a query sample set, wherein each of the query samples is a binary containing the natural language and the SQL; the natural language indicates an operation to be performed and the SQL is a corresponding database query language;

a module M1.2 for using a clarification template to prompt a large model to generate a corresponding clarified question for the SQL in the query samples; and generating the intent clarification samples in conjunction with the natural language;

a module M1.3 for drawing the query samples out one by one from the query sample set, and prompting the large model to generate a similar SQL to the query samples through a prompt template comprising a list of operations randomly selected from an operation set; then using the clarification template to prompt the large model to generate a corresponding formalized question based on the generated SQL; and a module M1.4 for randomly selecting N query samples from the query sample set, using the prompt template to prompt the large model to generate similar SQLs with reference to the N query samples, and use the clarification template to prompt the large model to generate corresponding formalized questions based on the generated SQLs.

Preferably, the module M2 comprises:

a module M2.1 for training a large language model with the intent clarification template to obtain the intent clarification adapter; and a module M2.2 for training the SQL clause generation adapter group, wherein the SQL clause generation adapter group comprises: a Select adapter, a From/Where adapter, a Having/Group adapter and an Order/Limit adapter.

Preferably, the module M3 comprises:

a module M3.1 for performing intent clarification on the input natural language question based on the intent clarification adapter to obtain the clarified question; and a module M3.2 for performing SQL chain generation for the clarified question with the SQL clause generation adapter group.

Preferably, in the module M2.2:

an input to the Select adapter is the clarified question; and an output is a Select section of an SQL statement;

an input to the From/Where adapter is the clarified question and the Select section of the SQL statement; and an output is From and Where sections of the SQL statement;

an input to the Having/Group adapter is the clarified question, the Select section, and the Where section; and an output is Having and Group sections of the SQL statement; and an input to the Order/Limit adapter is the clarified question, the Select section, and the Group section; and an output is Order and Limit sections of the SQL statement.

Compared with the prior art, the present invention has the following beneficial effects:

1. The method of the present invention is capable of highly accurate NL2SQL (Natural Language to SQL) through automatic data generation given a very small number of samples, which solves the problem that the model generation results in the prior art are completely dependent on the number of samples.
2. The present invention only requires a small number of samples as start-up data, which adopts SQL sample generation technology based on dynamic prompt templates, imitates the principle of the large model COT, and uses SQL context dependency to realize adapter chain call SQL generation technology; wherein the large model "adapter" refers to the additional weight training module added to the original model structure during training the large model by Lora related technology.

BRIEF DESCRIPTION OF THE DRAWINGS

Features, objects, and advantages of the present invention will become apparent from the following detailed description of preferred embodiments with reference to the accompanying drawings.

DETAILED DESCRIPTION OF THE PREFERRED EMBODIMENT

Figure 1:
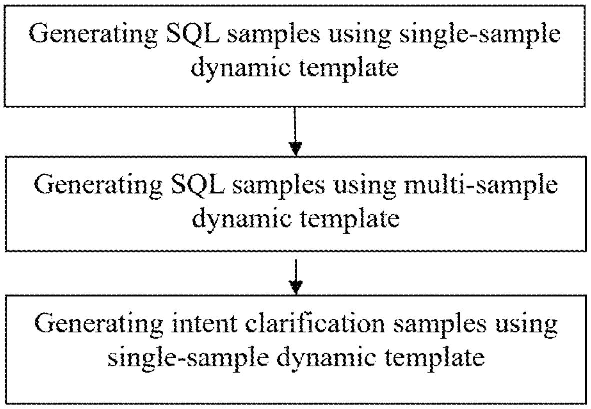
FIG. 1 is a flowchart of sample generation by using a dynamic template according to the present invention.
Figure 2:
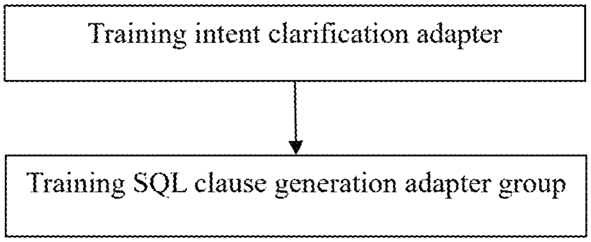
FIG. 2 is a flowchart of constructing an intent clarification adapter and an SQL clause generation adapter according to the present invention.
Figure 3:
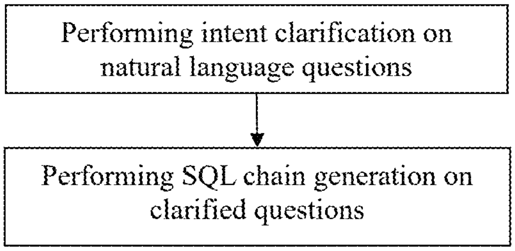
FIG. 3 is a flowchart of SQL generation through adapter chain call according to the present invention.

The present invention will be further described below in conjunction with preferred embodiments which are exemplary only and not intended to be limiting. It should be noted that to a person of ordinary skill in the art, several changes and modifications can be made without departing from the spirit of the present invention, which shall all fall within the protection scope of the present invention.

Referring to FIGS. 1-4, a method of the present invention for low-sample chained NL2SQL generation based on clause dependency comprises steps of:

step S1: obtaining query samples of a natural language to a SQL; performing intent clarification on the natural language to obtain intent clarification samples; and expanding a quantity of the query samples with a dynamic template;

step S2: constructing an intent clarification adapter using the intent clarification samples; and constructing an SQL clause generation adapter group; and step S3: using the intent clarification adapter to performing intent clarification on an input natural language question, and using the SQL clause generation adapter group to perform SQL chain generation for a clarified language.

The step S1 comprises specific steps of:

step S1.1: obtaining a query sample set, wherein each of the query samples is a binary containing the natural language and the SQL; the natural language indicates an operation to be performed and the SQL is a corresponding database query language;

for example:

```
natural language: statistics on recent trends in key network metrics between
00:1e:67:5b:79:57 and 00:1e:67:9b:60:0f.
   SQL: select MACNumToString(‘@client__mac‘) as client__mac,
      MACNumToString(‘@server__mac‘) as server__mac,
      sum(‘@pkt__len__c2s‘) / 1024 / 1024 / 1024 as gigabytes__c2s,
sum(‘@pkt__len__s2c‘) / 1024 / 1024 / 1024 as gigabytes__s2c,
      sum(‘@conn__open__cnt‘) as estb__conn,
      sum(‘@attach__succ‘) / sum(‘@attach__succ‘ + ‘@attach__fail‘) as
estb__succ__rate,
      sum(‘@pkt__cnt__c2s‘ + ‘@pkt__cnt__s2c‘) as packets,
      sum(‘@tcp__segment__lost__c2s‘ + ‘@tcp__segment__lost__s2c‘ +
‘@capture__lost__c2s‘ + ‘@capture__lost__s2c‘  ) / sum(  ‘@tcp__segment__lost__c2s‘ +
‘@tcp__segment__lost__s2c‘ + ‘@capture__lost__c2s‘ + ‘@capture__lost__s2c‘ +
‘@pkt__cnt__c2s‘ + ‘@pkt__cnt__s2c‘   ) as packets__loss__rate,
      sum(‘@retransmission__c2s‘ + ‘@retransmission__s2c‘) /
sum(‘@pkt__cnt__c2s‘ + ‘@pkt__cnt__s2c‘) as retransmission__rate,
(   sum(‘@network__delay__sum__c2s‘) / sum(‘@network__delay__cnt__c2s‘) +
sum(‘@network__delay__sum__s2c‘) / sum(‘@network__delay__cnt__s2c‘)   ) / 1000000 as
network__delay__ms
   from npm__conv.rollup__main
   where MACNumToString(‘@client__mac‘) in ('00:1E:67:5B:79:5D',
'00:1E:67:9B:60:14') and MACNumToString(‘@server__mac‘) in ('00:1E:67:5B:79:5D',
'00:1E:67:9B:60:14')
   group by client__mac,   server__mac
```

step S1.2: generating an intent clarification sample, wherein intent clarification is reformulation of a query into clear and formalized language; each intent clarification sample is a binary containing the query and the clarified question; the present invention generates the clarified questions by prompting the large model through the clarification template, and forms the intent clarification samples with the clarified questions and the query; the clarification template is, for example:

Below are the Standard—Examples of queries and the corresponding questions

Example—Query: SELECT MACNumToString (‘@client_mac’) as mac, sum(if(‘@ether_type’=‘IPv4’, ‘@pkt_cnt_c2s’+‘@pkt_cnt_s2c’, 0)) as ipv4_pkt_cnt, sum(if(‘@ether_type’!=‘IPv4’, ‘@pkt_cnt_c2s’+ ‘@pkt_cnt_s2c’, 0)) as ipv6_pkt_cnt, sum (‘@pkt_len_c2s’+‘@pkt_len_s2c’) as pkt_len, sum (‘@pkt_cnt_c2s’+‘@pkt_cnt_s2c’) as pkt_cnt FROM npm_conv.rollup_main WHERE sp_addr in (‘10.6.11.144’) AND nic in (‘nic0’) GROUP BY mac Example—Question: Filter: probe address is 10.6.11.144, nic is nic0; Aggregation: mac(client); Aggregation Filter: unlimited; Output Columns: mac(client), number of ipv4 packets, number of ipv6 packets, length of packets; Sorting Method: unlimited; Number of Return Entries: unlimited.

Now consider the following query.

Query: <Query SQL>

Write a question for the Query in the style of Example—Question.

Format your response as a JSON object, i.e.

{“explanation”: str, “question”: str}

First write an explanation in about 3-5 sentences, then write a one sentence question in style of Example—Question, must describe all output fields.

The “clarification template” is used to prompt the large model to filling the <Query SQL> section of the template with the SQL in all the query samples obtained in the step S1.1, and then the large language model outputs the clarified question corresponding to the SQL. With the above clarification template, an output of the model is a Json string, and the question section of the output Json is extracted as the clarified question corresponding to the input SQL. The “clarified questions” and the “natural language questions” together constitute the “intent clarification” samples such as (ORIGINAL_QUESTION is the query, and REWRITE_A S is the clarified question), wherein ORIGINAL_QUESTION comes from the “natural language” of the “query sample” mentioned in S1.1, and “REWRITE_AS comes from the “SQL” of the “query sample” after using the clarification template. An example of the constructed “intent clarification sample” is as follows:

{“ORIGINAL_QUESTION”: “statistics on recent trends in key network metrics between 00:1e:67:5b:79:57 and 00:1e:67:9b:60:0f.”, “REWRITE_AS”: “Filter: data between 00:1E:67:5B:79:57 and 00:1E:67:9B:60:0f for client mac; Aggregation: client mac, service mac; Aggregation Filter: unlimited; Output Columns: client mac, service mac, GBytes transferred by client, GBytes transferred by service, number of connections established, attachment success rate, total packets, packet loss rate, network latency ms; Sorting Method: unlimited; Number of Entries Returned: unlimited.”}.

step S1.3: generating SQL samples using a single-sample dynamic template; specifically, drawing the query samples out one by one from the query sample set, and prompting the large model to generate a similar SQL to the query samples through a prompt template comprising a list of operations randomly selected from an operation set; based on the operation list, prompting the large language model to generate SQL, and then prompting the large model again with the “clarification template” mentioned in “step S1.2”; filling the <Query SQL> section of the template with the newly generated SQL, so as to obtain a formalized question. For example, the “operation set” mentioned above is as follows:

a) Change the condition in WHERE clause.)

b) For the LIMIT clause, adjust the limit number, remove the LIMIT clause, or add a LIMIT clause.

c) For the ORDER BY clause, adjust the fields, remove the ORDER BY clause, or add an ORDER BY clause.
d) Make adjustments to the fields in the SELECT statement: remove fields, apply aliases, or change the order of fields.
e) If a GROUP BY clause exists, modify the field in the GROUP BY clause.
f) Use timeSlice to aggregrate by different time granularity.

Three operations are randomly selected and rearranged to form the operation list:

a) Make adjustments to the fields in the SELECT statement: remove fields, apply aliases, or change the order of fields.
b) Change the condition in WHERE clause.
c) If a GROUP BY clause exists, modify the field in the GROUP BY clause.

A prompt word template for generating SQL is formed:

Write two different queries that are similar to the given example for model training.

Example

Question: <question section of query sample>

Query: <SQL section of query sample>

Please do the every operation below to modify the example://a-f are randomly selected from the set a) Make adjustments to the fields in the SELECT statement: remove fields, apply aliases, or change the order of fields.
b) Change the condition in WHERE clause.
c) If a GROUP BY clause exists, modify the field in the GROUP BY clause.

Ensure the accuracy of the SQL syntax.

Never write the fields are not existed in the example.

Never use functions that are not mentioned in the example, except for standard SQL functions like SUM, AVG, etc.

Format the queries as a JSON object, i.e.

{"explanation": str, "sql_query_1": str, "sql_query_2": str}.

First write an explanation of why you decided to write these new queries in about 3-5 sentences, then write valid SQL queries for each of the 2 new queries.

Example of the final generated SQL and the corresponding formalized question (clarified question):

{"Question": "Filter: NIC is eth0; Aggregation: probe address, time slice 30 minutes; Aggregation Filter: unlimited; Output Columns: probe address, time slice, bps, packets; Sort Method: packets descending; Number of Entries Returned: 10.", "Query": "SELECT 'sp_addr', timeslice ('30 m') as ts, sum ('@pkt_len_c2s'+'@pkt_len_s2c')*8/60/60 as bps, count(*) as num_flows from npm_conv.rollup_main where 'nic'='eth0' group by 'sp_addr', ts order by 'sp_addr', ts limit 10;"}.

step S1.4: generating SQL samples using a multi-sample dynamic template; specifically, randomly selecting N query samples from the query sample set, using the prompt template to prompt the large model to generate similar SQLs with reference to the N query samples; then prompting the large model again with the "clarification template" mentioned in "step S1.2" to obtain formalized questions based on generated SQL. For example, the prompt template containing N (N=3) examples is as follows:

Write two different queries that are similar to the given examples for model training.

Examples: //three randomly selected examples

Question: <Seed1 question section>

Query: <Seed1 SQL section>

Question: <Seed2 question section>

Query: <Seed2 SQL section>

Question: <Seed3 question section>

Query: <Seed3 SQL section>

Ensure the accuracy of the SQL syntax.

Never write the fields are not existed in the example.

Never use functions that are not mentioned in the example, except for standard SQL functions like SUM, AVG, etc.

Format the queries as a JSON object, i.e.

{"explanation": str, "sql_query_1": str, "sql_query_2": str}.

First write an explanation of why you decided to write these new queries in about 3-5 sentences, then write valid SQL queries for each of the 2 new queries.

The above prompts are input into the large model, and then sql_query_1 and sql_query_2 are extracted from the output Json as the generated SQL. The final generated samples are similar to the form of step S1.3, and will not be repeated.

During generating SQL using the single-sample dynamic template, the large model will refer to a single specified sample for the generation of new SQL, expecting that the generated SQL will be more similar to the sample, and then the SQL sample is modified with the operations mentioned in step 1.3 for obtaining a new sample. This process results in a new sample that is quite similar to the specified sample, wherein the model trained by these data can surely give high-quality answers when a user raises questions that are close to those in the query samples.

During generating SQL using the multi-sample dynamic template, the large model will refer to multiple samples (more than 1) for the generation of new SQL, and the generated SQL will combine the forms of multiple reference SQLs, and the newly generated samples will have the characteristics of multiple SQLs, but differ a lot from each reference sample. This process results in samples that differ significantly from the query samples provided by the user, wherein the model trained by these data can give high-quality answers even when the user raises questions that differ significantly from those in the query samples, thus obtaining a model with higher generalization ability.

The step S2 comprises specific steps of:

step S2.1: training the intent clarification adapter; wherein the sample data generated in the step 1.2 is used to train the large language model adapter with the original question as input and the formalized question as output. The intent clarification adapter is trained using the large model adapter technology. For example, input of the following sample is the ORIGINAL_QUESTION section and the output is the REWRITE_AS section:

{"ORIGINAL_QUESTION": "statistics on recent trends in key network metrics between 00:1e:67:5b:79:57 and 00:1e:67:9b:60:0f.", "REWRITE_AS": "Filter: data between 00:1E:67:5B:79:57 and 00:1E:67:9B:60:0f for client mac; Aggregation: client mac, service mac; Aggregation Filter: unlimited; Output Columns: client mac, service mac, GBytes transferred by client, GBytes transferred by service, number of connections established, attachment success rate, total packets, packet loss rate, network latency ms; Sorting Method: unlimited; Number of Entries Returned: unlimited."} step S2.2: training the SQL clause generation adapter group, wherein the SQL clause generation adapter group comprises: a Select adapter, a From/Where adapter, a Having/Group adapter and an Order/Limit adapter. An input to the Select adapter is the formalized question; and an output is a Select section of an SQL statement; an input to the From/Where adapter is the formalized question and the Select section of the SQL statement; and an output is From and Where sections of the SQL statement; an input to the Having/Group adapter is the formalized question, the Select section, and the Where section; and an output is Having and Group sections of the SQL statement; and an input to the Order/Limit adapter is the formalized question, the Select section, and the Group section; and an output is Order and Limit sections of the SQL statement. Based on the samples, each adapter is trained using the large model adapter technology, and if there is no output for the corresponding section, it is filled with “no”. For example, inputs and outputs of each section are as follows:

```
// Sample for training Select adapters
Input:
Question: Filter: client mac is '00:1E:67:5B:79:5D' or '00:1E:67:9B:60:14' ...
Output:
{"Select__Clause": "MACNumToString(‘@client__mac‘) as client__mac,
MACNumToString(‘@server__mac‘) as server__mac, ..."}
// Sample for training From/Where adapter
Input:
Question: Filter: client mac is '00:1E:67:5B:79:5D' or '00:1E:67:9B:60:14' ...
Select Clause:
MACNumToString(‘@client__mac‘) as client__mac, ...
MACNumToString(‘@server__mac‘) as server__mac, ...
Output: {"From__Clause": "npm__log__table", "Where__Clause".
"MACNumToString(‘@client__mac‘) in ('00:1E:67:5B:79:5D', '00:1E:67:9B:60:14')
and MACNumToString(‘@server__mac‘) in ('00:1E:67. 5B:79:5D',
'00:1E:67:9B:60:14')"}
// Sample for training Having/Group adapter
Input:
Question: Filter: client mac is '00:1E:67:5B:79:5D' or '00:1E:67:9B:60:14' ...
Select Clause:
MACNumToString(‘@client__mac‘) as client__mac, ...
MACNumToString(‘@server__mac‘) as server__mac, ...
```

Where Clause: MACNumToString (‘@client_mac’) in (‘00:1E:67:5B:79:5D’. ‘00:1E:67:9B:60:14’) and MACNumToString (‘@server_mac’) in (‘00:1E: 67.5B:79:5D’, ‘00:1E:67:9B:60:14’)

```
Output: {"Group__Clause": "client__mac, server__mac", "Having__Clause" :
"no"}
// Sample for training Order/Limit adapter
Input:
Question: Filter: client mac is '00:1E:67:5B:79:5D' or '00:1E:67:9B:60:14' ...
Select Clause:
MACNumToString(‘@client__mac‘) as client__mac,
MACNumToString(‘@server__mac‘) as server__mac, ...
Group Clause: client__mac,   server__mac
Output: {"Order__Clause": "no", "Limit": "no "}
```

The step S3 comprises specific steps of:

step S3.1: performing intent clarification on the input natural language question; specifically, loading the large model and the intent clarification adapter trained in the step S2.1; if a current user question is User_Question, submitting the question to the large model based on a question template, and obtaining a clarified intent from an output of the large model, and defining the clarified intent as Clarified_Question. For example, the question template is as follows:

Below are the Standard—Examples of queries and the corresponding questions

Example—Query: SELECT MACNumToString (@client_mac') as mac, sum(if(‘@ether_type’=‘IPv4’, ‘@pkt_cnt_c2s’+‘@pkt_cnt_s2c’, 0)) as ipv4_pkt_cnt, sum(if(‘@ether_type’!=‘IPv4’, ‘@pkt_cnt_c2s’+ ‘@pkt_cnt_s2c’, 0)) as ipv6_pkt_cnt, sum (‘@pkt_len_c2s’+‘@pkt_len_s2c’) as pkt_len, sum (‘@pkt_cnt_c2s’+‘@pkt_cnt_s2c’) as pkt_cnt FROM npm_conv.rollup_main WHERE sp_addr in (‘10.6.11.144’) AND nic in (‘nic0’) GROUP BY mac Example—Question: Filter: probe address is 10.6.11.144, nic is nic0; Aggregation: mac (client); Aggregation filter: unlimited; Output Columns: mac (client), number of ipv4 packets, number of ipv6 packets, length of packets; Sorting Method: unlimited; Number of Return Entries: unlimited.

Now consider the following query.

Query: <User_Question>

Write a question for the Query in the style of Example—Question.

Format your response as a JSON object, i.e.

{“explanation”: str, “question”: str}

First write an explanation in about 3-5 sentences, then write a one sentence question in style of Example—Question, must describe all output fields.

Figure 4:
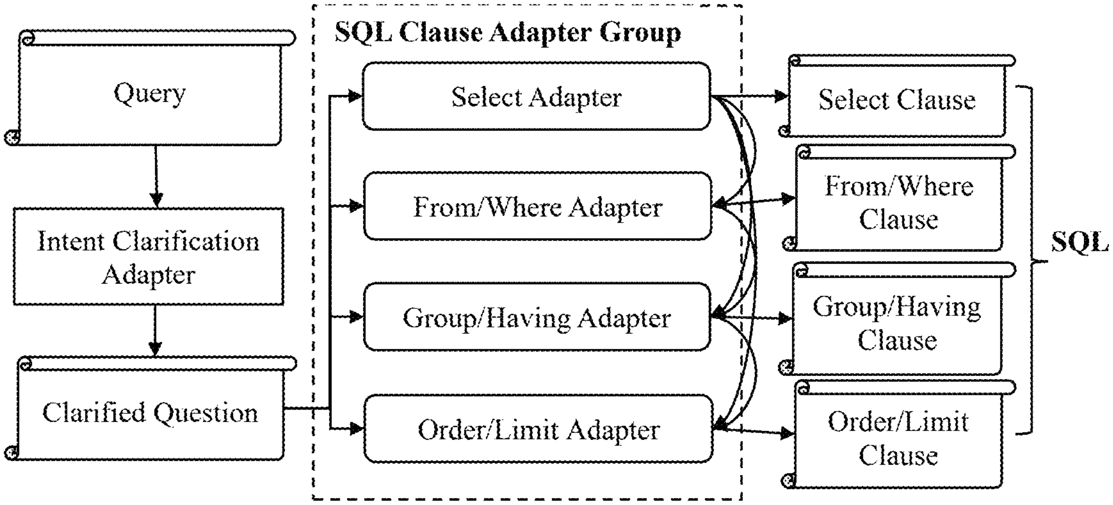
FIG. 4 is a flowchart of an adapter from question to SQL according to the present invention.

The question part of the Json output by the large model is extracted as Clarified_Question.

step S3.2: performing SQL chain generation with the clarified language; loading the large model and the “Select adapter”, inputing Clarified_Question to the adapter, and obtaining a Select clause as Select_Clause; loading the large model and the “From/Where adapter”, inputting Clarified_Question and Select_Clause to the adapter, and obtaining a From clause and a Where clause as From_Clause and Where_Clause; loading the large model and the "Group/Having Adapter", inputting Clarified_Question, Select_Clause, Where_Clause to the adapter, and obtaining a Group clause and a Having clause as Group_Clause and Having_Clause; loading the large model and the "Order/Limit adapter", inputting Clarified_Question, Select_Clause, and Group_Clause to the adapter, and obtaining a Order clause and a Limit clause as Order_Clause and Limit_Clause; assembling Select_Clause, From_Clause, Where_Clause, Group_Clause, Having_Clause, Order_Clause, and Limit_Clause as a complete SQL, wherein a flowchart of this process is shown in FIG. 4.

Template examples of each sections are given below:

```
Template for Select adapter:
Now the User Question is as below.
<Clarified_Question>
Please write the select_clause for the question.
Format your response as a JSON object, i.e.
{ "Select_Clause": str }
Template for From/Where adapter:
Now the User Question is as below.
<Clarified_Question>
The Select Clause.
<Select_Clause >
Please write the from_clause and where_clause for the question.
Format your response as a JSON object, i.e.
{ "From_Clause": str, "Where_Clause": str}
Template for Group/Having adapter:
Now the User Question is as below.
<Clarified_Question>
The Select Clause.
<Select_Clause >
The Where Clause.
<Where_Clause >
Please write the group_clause and having_clause for the question.
Format your response as a JSON object, i.e.
{ "Group_Clause": str, "Having_Clause": str}
Template for Order/Limit adapter:
Now the User Question is as below.
<Clarified_Question>
The Select Clause.
<Select_Clause >
The Group Clause:
<Group_Clause>
Please write the order_clause and limit_clause for the question.
Format your response as a JSON object, i.e.
{ "Order_Clause": str, "Limit_Clause": str}
Output sample:
// Select Adapter Output
{ "Select_Clause": "client_ip, client_mac, sum(c2s_pkt_len) as c2s_pkt_size"}
// From/Where adapter output
{ "From_Clause": "npm_table", "Where_Clause": "server_site in ('app1')" }
// Group/Having adapter output
{ "Group_Clause": "client_ip, client_mac", "Having_Clause": "no" }
// Order/Limit adapter outputs
{ "Order_Clause": "client_ip", "Limit_Clause": "50" }
Combine into SQL for:
select client_ip, client_mac, sum(c2s_pkt_len) as c2s_pkt_size
from npm_table
where server_site in ('app1')
group by client_ip, client_mac
order by client_ip
Limit 50
```

The present invention also provides a system for low-sample chained NL2SQL generation based on clause dependency, which can execute the method for the low-sample chained NL2SQL generation based on the clause dependency. That is to say, those skilled in the art may regard the method for the low-sample chained NL2SQL generation based on the clause dependency as a preferred embodiment of the system for the low-sample chained NL2SQL generation based on the clause dependency.

The system of the present invention comprises:

a module M1 for obtaining query samples of a natural language to a SQL; performing intent clarification on the natural language to obtain intent clarification samples; and expanding a quantity of the query samples with a dynamic template;

specifically, the module M1 comprises:

a module M1.1 for obtaining a query sample set, wherein each of the query samples is a binary containing the natural language and the SQL; the natural language indicates an operation to be performed and the SQL is a corresponding database query language;

a module M1.2 for using a clarification template to prompt a large model to generate a corresponding clarified question for the SQL in the query samples; and generating the intent clarification samples in conjunction with the natural language;

a module M1.3 for drawing the query samples out one by one from the query sample set, and prompting the large model to generate a similar SQL to the query samples through a prompt template comprising a list of operations randomly selected from an operation set; then using the clarification template to prompt the large model to generate a corresponding formalized question based on the generated SQL; and a module M1.4 for randomly selecting N query samples from the query sample set, using the prompt template to prompt the large model to generate similar SQLs with reference to the N query samples, and use the clarification template to prompt the large model to generate corresponding formalized questions based on the generated SQLs;

a module M2 for constructing an intent clarification adapter using the intent clarification samples; and constructing an SQL clause generation adapter group;

specifically, the module M2 comprises:

a module M2.1 for training a large language model with the intent clarification template to obtain the intent clarification adapter; and a module M2.2 for training the SQL clause generation adapter group, wherein the SQL clause generation adapter group comprises: a Select adapter, a From/Where adapter, a Having/Group adapter and an Order/Limit adapter;

wherein an input to the Select adapter is the clarified question; and an output is a Select section of an SQL statement;

an input to the From/Where adapter is the clarified question and the Select section of the SQL statement; and an output is From and Where sections of the SQL statement;

an input to the Having/Group adapter is the clarified question, the Select section, and the Where section; and an output is Having and Group sections of the SQL statement; and an input to the Order/Limit adapter is the clarified question, the Select section, and the Group section; and an output is Order and Limit sections of the SQL statement;

a module M3 for using the intent clarification adapter to performing intent clarification on an input natural language question, and using the SQL clause generation adapter group to perform SQL chain generation for a clarified language;

specifically the module M3 comprises:

a module M3.1 for performing intent clarification on the input natural language question based on the intent clarification adapter to obtain the clarified question; and a module M3.2 for performing SQL chain generation for the clarified question with the SQL clause generation adapter group.

It is known to those skilled in the art that, in addition to realizing the system provided herein and its various devices, modules, and units in purely computer-readable program codes, it is entirely possible to program the method steps logically to enable the system provided herein and its various devices, modules, and units to perform the same function in the form of logic gates, switches, special integrated circuits, programmable logic controllers, embedded microcontrollers, and the like. Therefore, the system provided by the present invention and the devices, modules, and units therein can be considered as a hardware component, and the devices, modules, and units included therein for realizing various functions can be considered as structures within the hardware component. Even more, the devices, modules, and units for realizing various functions can be considered as software modules for realizing the method as well as structures within the hardware component.

Preferred embodiments of the present invention are described above. It is to be understood that the present invention is not limited thereto, and those skilled in the art may make various changes or modifications within the scope of the following claims, which do not affect the substance of the present invention. The embodiments and the features in the embodiments of the present invention may be combined with each other at will, provided that there is no conflict.

What is claimed is:

1. A method for low-sample chained NL2SQL (Natural Language to Structured Query Language) generation based on clause dependency, comprising steps of:

step S1: obtaining query samples of a natural language to a SQL; performing intent clarification on the natural language to obtain intent clarification samples; and expanding a quantity of the query samples with a prompt template comprising a list of operations randomly selected from an operation set, wherein the operation set comprises:

a) Change the condition in WHERE clause;

b) For the LIMIT clause, adjust the limit number, remove the LIMIT clause, or add a LIMIT clause;

c) For the ORDER BY clause, adjust the fields, remove the ORDER BY clause, or add an ORDER BY clause;

d) Make adjustments to the fields in the SELECT statement: remove fields, apply aliases, or change the order of fields;

e) If a GROUP BY clause exists, modify the field in the GROUP BY clause; and f) Use timeSlice to aggregrate by different time granularity;

step S2: constructing an intent clarification adapter using the intent clarification samples; and constructing an SQL clause generation adapter group; and step S3: using the intent clarification adapter to performing intent clarification on an input natural language question, and using the SQL clause generation adapter group to perform SQL chain generation for a clarified language.

2. The method, as recited in claim 1, wherein the step S1 comprises specific steps of:

step S1.1: obtaining a query sample set, wherein each of the query samples is a binary containing the natural language and the SQL; the natural language indicates an operation to be performed and the SQL is a corresponding database query language;

step S1.2: using a clarification template to prompt a large model to generate a corresponding clarified question for the SQL in the query samples; and generating the intent clarification samples in conjunction with the natural language;

step S1.3: drawing the query samples out one by one from the query sample set, and prompting the large model to generate a similar SQL to the query samples through the prompt template comprising a list of operations randomly selected from an operation set; then using the clarification template to prompt the large model to generate a corresponding formalized question based on the generated SQL; and step S1.4: randomly selecting N query samples from the query sample set, using the prompt template to prompt the large model to generate similar SQLs with reference to the N query samples, and use the clarification template to prompt the large model to generate corresponding formalized questions based on the generated SQLs.

3. The method, as recited in claim 1, wherein the step S2 comprises specific steps of:

step S2.1: training a large language model with the intent clarification template to obtain the intent clarification adapter; and step S2.2: training the SQL clause generation adapter group, wherein the SQL clause generation adapter group comprises: a Select adapter, a From/Where adapter, a Having/Group adapter and an Order/Limit adapter.

4. The method, as recited in claim 1, wherein the step S3 comprises specific steps of:

step S3.1: performing intent clarification on the input natural language question based on the intent clarification adapter to obtain the clarified question; and step S3.2: performing SQL chain generation for the clarified question with the SQL clause generation adapter group.

5. The method, as recited in claim 3, wherein in the step S2.2:

an input to the Select adapter is the clarified question; and an output is a Select section of an SQL statement;

an input to the From/Where adapter is the clarified question and the Select section of the SQL statement; and an output is From and Where sections of the SQL statement;

an input to the Having/Group adapter is the clarified question, the Select section, and the Where section; and an output is Having and Group sections of the SQL statement; and an input to the Order/Limit adapter is the clarified question, the Select section, and the Group section; and an output is Order and Limit sections of the SQL statement.

6. The system, as recited in claim 1, wherein the module M3 comprises:

a module M3.1 for performing intent clarification on the input natural language question based on the intent clarification adapter to obtain the clarified question; and a module M3.2 for performing SQL chain generation for the clarified question with the SQL clause generation adapter group.

7. A system for low-sample chained NL2SQL (Natural Language to Structured Query Language) generation based on clause dependency, comprising:

a module M1 for obtaining query samples of a natural language to a SQL;

performing intent clarification on the natural language to obtain intent clarification samples; and expanding a quantity of the query samples with a prompt template comprising a list of operations randomly selected from an operation set, wherein the operation set comprises:

a) Change the condition in WHERE clause;

b) For the LIMIT clause, adjust the limit number, remove the LIMIT clause, or add a LIMIT clause;

c) For the ORDER BY clause, adjust the fields, remove the ORDER BY clause, or add an ORDER BY clause;

d) Make adjustments to the fields in the SELECT statement: remove fields, apply aliases, or change the order of fields;

e) If a GROUP BY clause exists, modify the field in the GROUP BY clause; and f) Use timeSlice to aggregate by different time granularity;

a module M2 for constructing an intent clarification adapter using the intent clarification samples; and constructing an SQL clause generation adapter group; and a module M3 for using the intent clarification adapter to performing intent clarification on an input natural language question, and using the SQL clause generation adapter group to perform SQL chain generation for a clarified language.

8. The system, as recited in claim 7, wherein the module M1 comprises:

a module M1.1 for obtaining a query sample set, wherein each of the query samples is a binary containing the natural language and the SQL; the natural language indicates an operation to be performed and the SQL is a corresponding database query language;

a module M1.2 for using a clarification template to prompt a large model to generate a corresponding clarified question for the SQL in the query samples; and generating the intent clarification samples in conjunction with the natural language;

a module M1.3 for drawing the query samples out one by one from the query sample set, and prompting the large model to generate a similar SQL to the query samples through the prompt template; then using the clarification template to prompt the large model to generate a corresponding formalized question based on the generated SQL; and a module M1.4 for randomly selecting N query samples from the query sample set, using the prompt template to prompt the large model to generate similar SQLs with reference to the N query samples, and use the clarification template to prompt the large model to generate corresponding formalized questions based on the generated SQLs.

9. The system, as recited in claim 7, wherein the module M2 comprises:

a module M2.1 for training a large language model with the intent clarification template to obtain the intent clarification adapter; and a module M2.2 for training the SQL clause generation adapter group, wherein the SQL clause generation adapter group comprises: a Select adapter, a From/Where adapter, a Having/Group adapter and an Order/Limit adapter.

10. The system, as recited in claim 9, wherein in the module M2.2:

an input to the Select adapter is the clarified question; and an output is a Select section of an SQL statement;

an input to the From/Where adapter is the clarified question and the Select section of the SQL statement; and an output is From and Where sections of the SQL statement;

an input to the Having/Group adapter is the clarified question, the Select section, and the Where section; and an output is Having and Group sections of the SQL statement; and an input to the Order/Limit adapter is the clarified question, the Select section, and the Group section; and an output is Order and Limit sections of the SQL statement.

* * * * *